United States Patent
Schult et al.

(10) Patent No.: US 10,532,710 B2
(45) Date of Patent: Jan. 14, 2020

(54) ELECTRICAL POWER SUPPLY SYSTEM WITH MULTIPHASE GENERATORS AND AIRCRAFT HAVING SUCH AN ELECTRICAL POWER SUPPLY SYSTEM

(71) Applicants: Airbus Operations SL, Getafe (ES); Airbus Operations GmbH, Hamburg (DE)

(72) Inventors: Jens Schult, Hamburg (DE); Leire Segura Martinez De Ilarduya, Vitoria-Gasteiz (ES); Joerg Wangemann, Magdeburg (DE)

(73) Assignees: Airbus Operations SL (ES); Airbus Operations GmbH (DE)

( * ) Notice: Subject to any disclaimer, the term of this patent is extended or adjusted under 35 U.S.C. 154(b) by 48 days.

(21) Appl. No.: 15/597,604

(22) Filed: May 17, 2017

(65) Prior Publication Data
US 2017/0334378 A1   Nov. 23, 2017

(30) Foreign Application Priority Data
May 18, 2016   (EP) .................................... 16170192

(51) Int. Cl.
*B60R 16/03* (2006.01)
(52) U.S. Cl.
CPC .................... *B60R 16/03* (2013.01)
(58) Field of Classification Search
CPC ................. B60R 16/03; H02J 3/005
See application file for complete search history.

(56) References Cited

U.S. PATENT DOCUMENTS

| | | | | |
|---|---|---|---|---|
| 3,256,244 | A | * | 6/1966 | Byloff .................. H02M 5/271 332/178 |
| 4,967,096 | A | * | 10/1990 | Diemer .................. F02N 11/04 290/38 R |
| 2012/0025604 | A1 | | 2/2012 | Baumann et al. |
| 2012/0232728 | A1 | | 9/2012 | Karimi et al. |
| 2018/0050807 | A1 | * | 2/2018 | Kupiszewski ......... B64D 27/24 |

FOREIGN PATENT DOCUMENTS

| | | |
|---|---|---|
| EP | 2 860 834 A2 | 4/2015 |
| WO | 2006/024005 A2 | 3/2006 |

OTHER PUBLICATIONS

Aug. 8, 2016 Search Report EP 16170192.5.

* cited by examiner

*Primary Examiner* — Daniel Kessie
(74) *Attorney, Agent, or Firm* — Lerner, David, Littenberg, Krumholz & Mentlik, LLP

(57) ABSTRACT

An electrical power supply system for an aircraft includes a plurality of generators, each being couplable to and rotatable by an aircraft engine. and a plurality of electrical conversion units, each having a plurality of inputs and at least one output. Each generator includes at least four AC phases. The inputs of each individual electrical conversion unit are connected to a plurality of phases of at least two of the plurality of generators. The electrical conversion units each includes a rectification and conversion device for providing an output voltage having a predeterminable frequency and voltage level at the output.

15 Claims, 3 Drawing Sheets

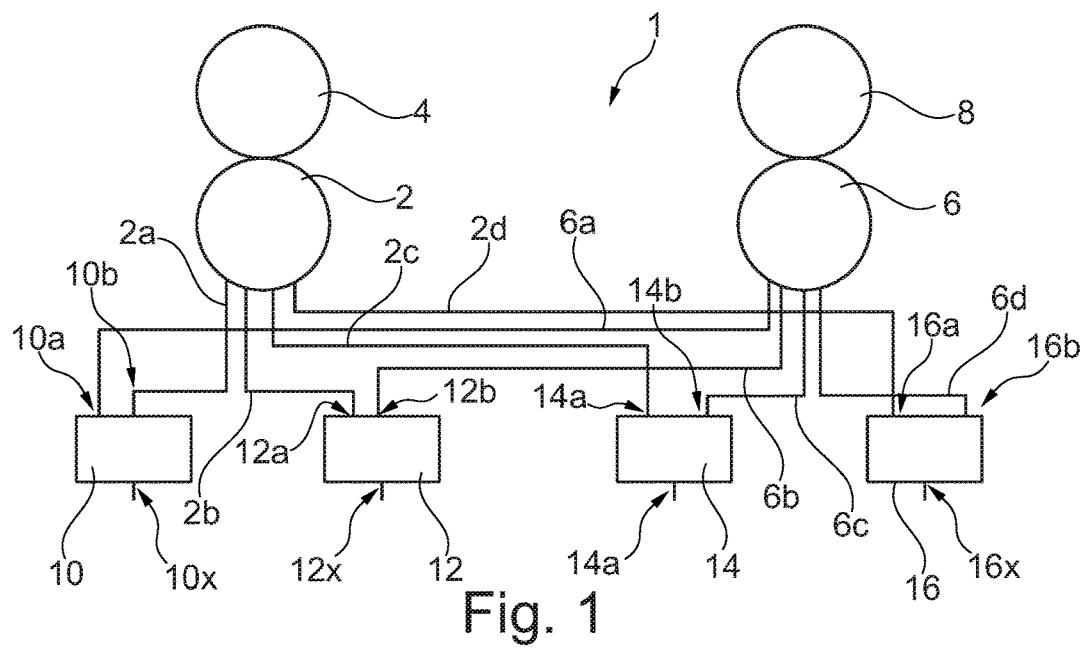
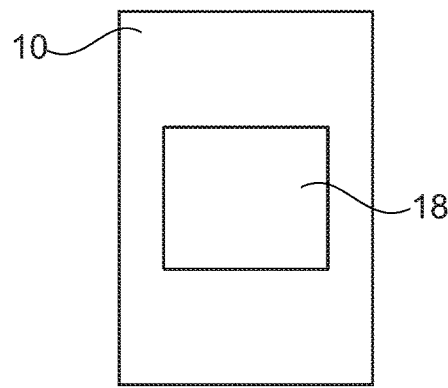
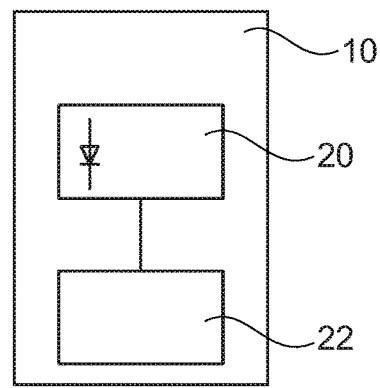
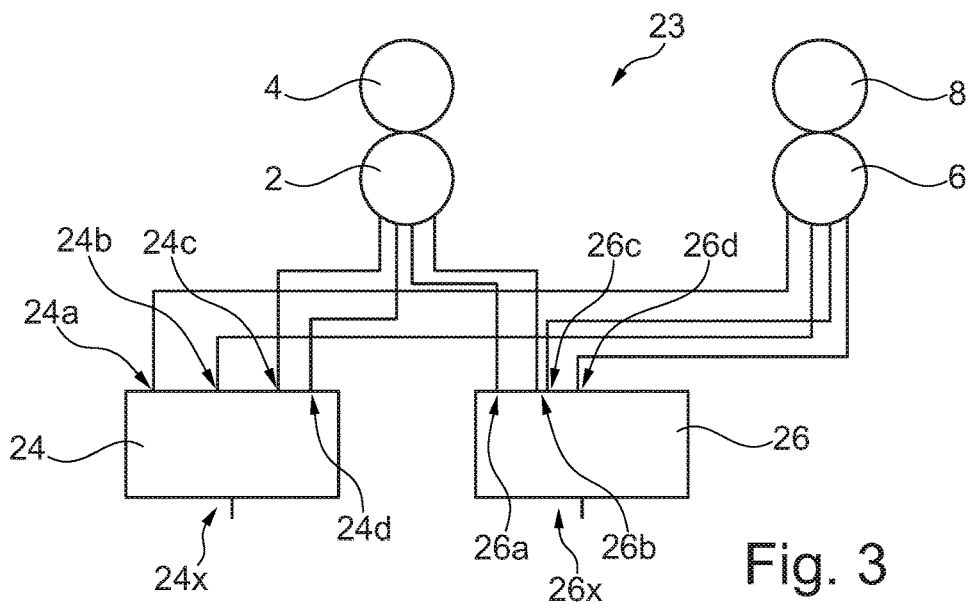

ELECTRICAL POWER SUPPLY SYSTEM WITH MULTIPHASE GENERATORS AND AIRCRAFT HAVING SUCH AN ELECTRICAL POWER SUPPLY SYSTEM

FIELD OF THE INVENTION

The invention relates to an electrical power supply system for an aircraft and to an aircraft having at least two engines and such an electrical power supply system.

BACKGROUND OF THE INVENTION

In commercial aircraft it is known to use several, e.g. four, electrical generators in order to generate electrical power, which results in the use of up to two generators per aircraft engine. An individual generator is rather complex and may comprise a permanent magnet generator, a main exciter and a synchronous generator. Further, it is generally known that these generators require a generator control unit (GCU) to control the generator electrical output by adjusting the field current to compensate for load and speed variations. For reaching a sufficient system safety and redundancy, several independent generators are used, which in turn raises a need for mechanical gears to couple the generators with the engine. In older aircraft, integrated drive generators (IDG) are used, which are based on a mechanic-hydraulic gear, have a rather high weight and are more expensive.

US 2012/0025604 A1 shows an electrical power supply system for an aircraft comprising at least one main generator feeding at least one technical load and at least one commercial load through at least one electrical power distribution channel comprising at least one electrical distribution bus bar and at least one voltage converter.

BRIEF SUMMARY OF THE INVENTION

An aspect of the invention proposes an electrical power supply system for an aircraft having a distinctly lower weight, while increasing the system reliability requirements and also being suitable for future high voltage DC architectures.

An electrical power supply system for an aircraft is proposed, the system comprising a plurality of generators, each being couplable and rotatable by an aircraft engine, each generator comprising at least four AC phases, and a plurality of electrical conversion units, each having a plurality of inputs and at least one output, wherein the inputs of each individual electrical conversion unit are connected to a plurality of phases of at least two of the plurality of generators. Each electrical conversion unit comprises a rectification and conversion device for providing an output voltage having a predeterminable frequency and voltage level at the output.

According to an embodiment of the invention, the electrical power supply system relies on the use of multi-phase generators, which are rotatable by an aircraft engine. Each generator preferably comprises at least four AC phases, which may also sum up to five, six, seven or even more phases. Further, the generators may be synchronous or asynchronous generators, which may use permanent magnets as main exciters.

Different than in common installations, various phases of each of the generators are connected to different electrical conversion units, which in turn are connected to at least one phase of each of at least two of the used generators. Each individual phase will be processed in the electrical conversion units for producing an output voltage having a predeterminable controlled fixed frequency and voltage level at the output of the electrical conversion units. This means, that the electrical generators do not need to produce an electrical output having a controlled voltage level and a fixed, predetermined frequency, since the provision of these required parameters is conducted in the electrical conversion units. Additionally, generator control units (GCU) are not necessary any more, too, since the function of the GCU will be a part of the electrical conversion units.

Since each electrical conversion unit has a number of input phase channels, which will be connected to different generators in total, an unwanted situation leading to a loss of one or more output phases of a generator will not lead to a loss of electrical power provided by the electrical conversion units at all. These will be still able to provide electrical power to an associated bus bar. In case the delivered amount of power is no longer able to serve the demand by the consumer, a load shedding may be conducted, as it is done today when a single phase of the generator is lost.

The system according to an embodiment of the invention provides an advanced fault tolerance and a distinctly lower weight and less complexity compared with common systems. Furthermore, if the output frequency of the electrical conversion units is set to 0, the system according to the invention is also capable to serve a high voltage DC architecture in an aircraft. In such a case, the electrical conversion units may be reduced to a simple rectification function.

In an exemplary embodiment, each electrical conversion unit comprises a number of inputs, which number equals an integer multiple of the number of generators, wherein the inputs of each electrical conversion unit are coupled with a corresponding number of phases of each generator. Hence, each electrical conversion unit may be connected to a single, a pair of or even more phases of a generator, thereby increasing the redundancy. As a side effect, the more phases of a generator are connected to an electrical conversion unit, the less ripple effects will occur on the output of the electrical conversion unit. To improve the redundancy, the above-mentioned integer multiple may at least be two.

It is advantageous if the number of electrical conversion units is equal to the number of AC phases per generator. Hence, the electrical conversion units may be connected to another phase or another group of phases of each generator, which leads to a further improved reliability.

However, the number of electrical conversion units may also be less than the number of AC phases per generator, wherein the inputs of each electrical conversion unit is coupled with a corresponding number of phases of a part of the generators. This allows providing a number of independent electrical networks, buses or bus bars that is lower than the number of AC phases per generator, but having the same improved reliability.

It is furthermore preferred that each of the AC phases of each of the generators is connected to a different electrical conversion unit.

In another advantageous embodiment, each of the electrical conversion units comprises a rectification device for each of its inputs. Further, each rectification device is adapted for conducting a rectification of the voltage at the associated input prior to generating an output voltage. The outputs of the generators do not need to match in terms of frequency and voltage levels, which in turn drastically reduces the requirements for a certain form of the delivered voltage and, consequently, a synchronization of the generators. The rectification device may be a part of the rectification and conversion device. However, the rectification and conversion device may be separated into two parts, which exclusively provide a rectification or a conversion.

Advantageously, each of the electrical conversion units comprises a single output, wherein each of the electrical conversion units is adapted for generating a single voltage at the output from rectified voltages of all inputs. Preferably, the delivered output voltages from the different generators are connected to the input of a conversion device in the electrical conversion unit in a parallel connection, such that a common output having a common frequency is created, where all individual currents associated with the different phases are added together. Consequently, in case of a loss of one of the phases, the remaining phases still deliver electrical power. The conversion device may be a part of the rectification and conversion device. However, as stated above, the rectification and conversion device may be separated into two parts, which exclusively provide a rectification or a conversion.

In another advantageous embodiment, the outputs of at least two electrical conversion units are connected to a switching circuit, which is connected to a single electrical power supply line. In this regard, the electrical power supply line is a supply line that extends to the electrical consumers. The switching circuit is adapted for selectively connecting the outputs of the at least two electrical conversion units to the electrical power line. The power line in turn is connected to a certain electrical bus bar in the aircraft. In addition to the redundancy achieved by the connection of different phases to different electrical conversion units, the switching unit may even further increase the reliability. The switching circuit may be a mechanical device or an electronic device based on semiconductors, wherein depending on load demands, generator states or other parameters power delivery to a certain bus bar may be swapped or combined.

In a preferred embodiment, the switching circuit is adapted for exclusively connecting only one of the outputs to the electrical power line at a time. Hence, in case a certain electrical conversion unit is not able to deliver the power required on the electrical power supply line, e.g. in case of an issue with one of the AC phases of a generator, another electrical conversion unit may be connected to the electrical power supply line, while the previously connected electrical conversion unit may be connected to a bus bar with lower power demand.

As stated above, the switching circuit may also be adapted for connecting more than one of the outputs to the electric power line at a time, wherein the associated electrical conversion units are adapted for providing synchronized frequencies of the voltages at the associated outputs. For this purpose, the electrical conversion units may be coupled through a data transferring bus or network, such that they are able to synchronize their frequencies. Higher power demands may then be met.

Due to the less elaborated requirements for the delivered voltages of the generators, these may be realized as permanent magnet generators.

At least one of the electrical conversion units may be adapted for providing a DC current at the associated output. Future aircraft with an electrical network based on a high DC voltage may then be provided with such an electrical power supply system.

The invention also relates to an aircraft having at least two engines and at least one system according to the above description.

Preferably, the aircraft comprises at least two electrical buses, each of the electrical buses being connected to the output of a different electrical conversion unit.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

FIG. 1 shows a first exemplary embodiment of a power supply system.

FIGS. 2a and 2b show an electrical conversion unit with an active rectification (FIG. 2a) and separate rectifier and conversion device (FIG. 2b).

FIG. 3 shows another exemplary embodiment of a power supply system.

DETAILED DESCRIPTION

Figure 4:
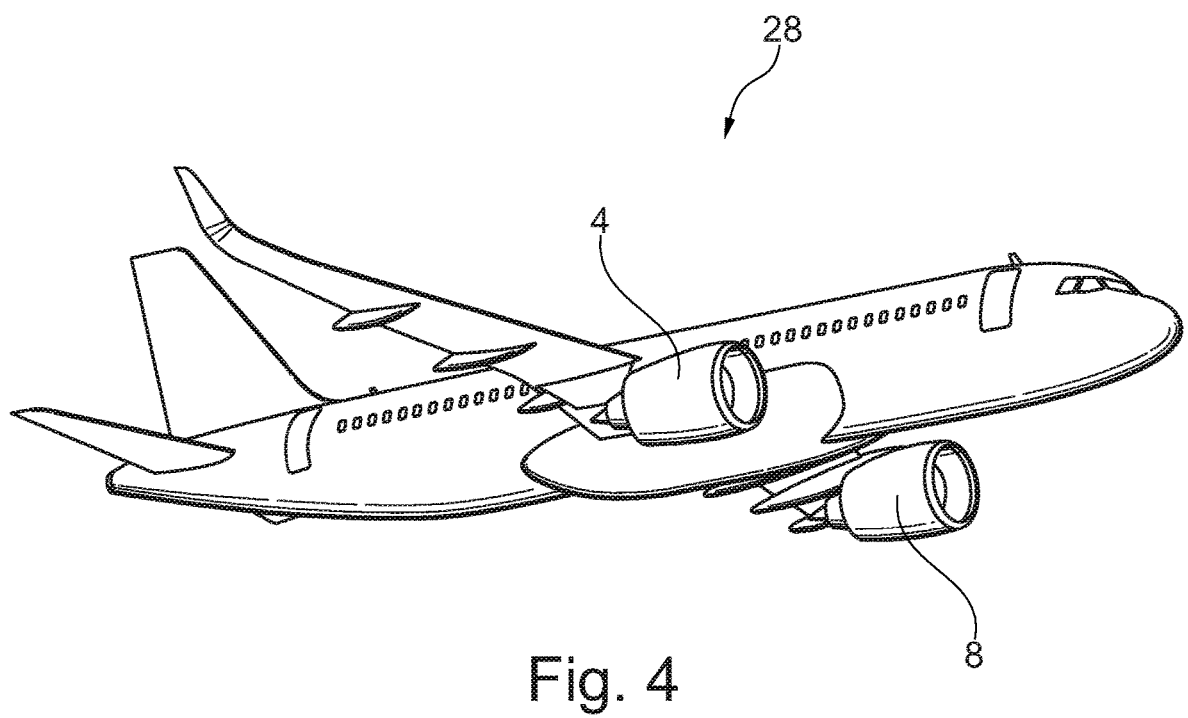
FIG. 4 shows an aircraft having two engines and an electrical power supply system.

FIG. 1 shows an electrical power supply system 1 for an aircraft having a first generator 2, coupled to a first engine 4 as well as a second generator 6 coupled with a second engine 8. The first and the second generators 2 and 6 exemplarily have four AC phases 2a, 2b, 2c and 2d and 6a, 6b, 6c and 6d, respectively. Both generators 2 and 6 are further exemplarily realized as permanent magnet generators with a considerably simple design. However, due to the simplicity of the generators 2 and 6, the voltage level as well as the frequency of the voltages present at the phases 2a to 2d and 6a to 6d primarily depends on the rotational speed of the respective engine 4 and 8.

The power supply system 1 exemplarily also comprises four conversion units 10, 12, 14 and 16, which comprise two inputs 10a, 10b, 12a, 12b, 14a, 14b and 16a, 16b. In the exemplary embodiment of FIG. 1, each of the electrical conversion units 10, 12, 14 and 16 is coupled with a single phase of each of the generators 2 and 6, such that input 10a is connected to phase 6a, input 10b with phase 2a, etc., according to the following table 1

TABLE 1

| Conversion unit | Input | Generator | Phase |
|---|---|---|---|
| 10 | 10a | 6 | 6a |
| 10 | 10b | 2 | 2a |
| 12 | 12a | 2 | 2b |
| 12 | 12b | 6 | 6b |
| 14 | 14a | 2 | 2c |
| 14 | 14b | 6 | 6c |
| 16 | 16a | 2 | 2d |
| 16 | 16b | 6 | 6d |

Figure 5:
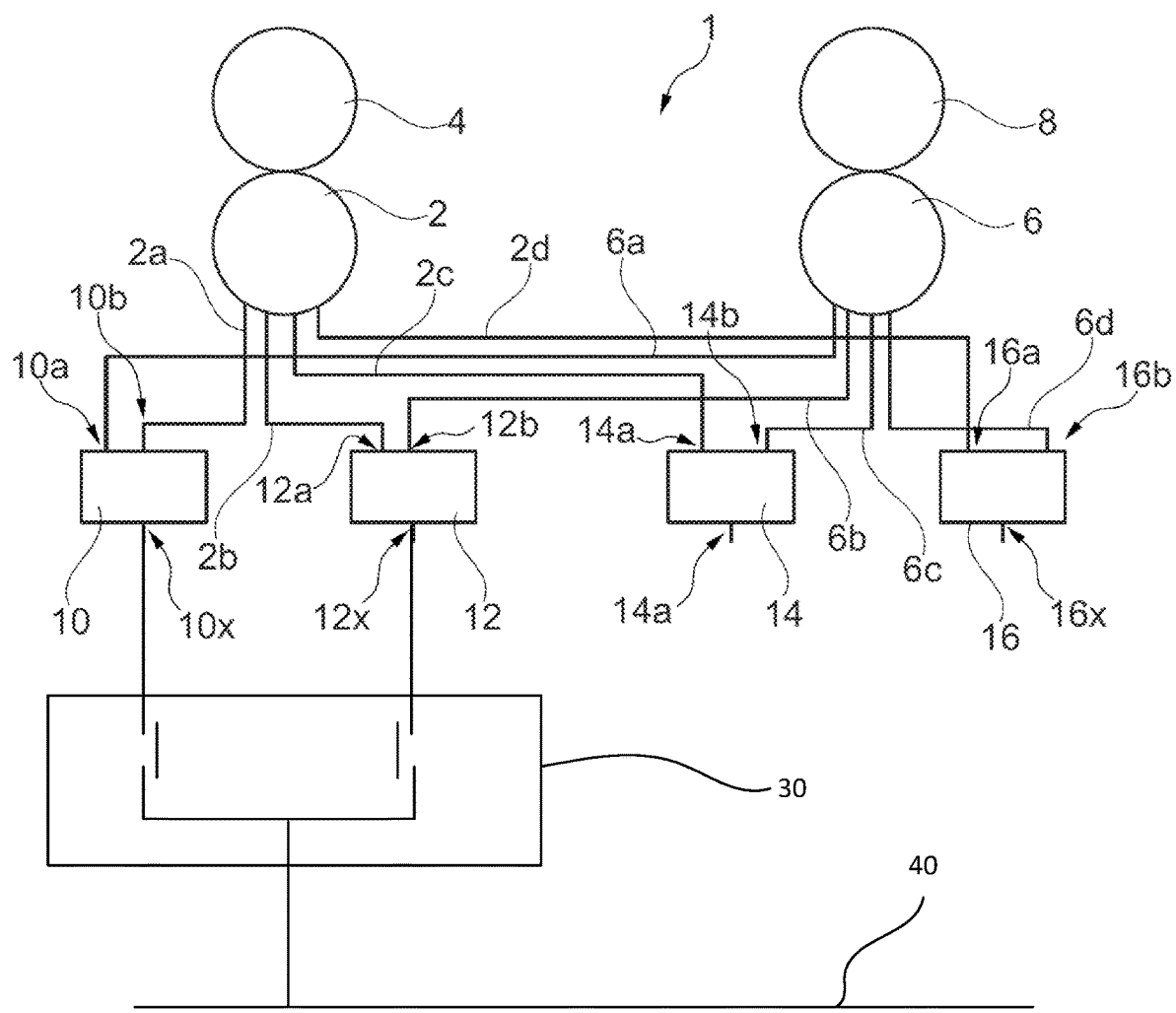
FIG. 5 shows the first exemplary embodiment of FIG. 1 with an exemplary switching circuit.

When feeding two phases into each conversion unit 10, 12, 14 and 16, a certain reliability is reached, as a voltage provided by the conversion units 10, 12, 14 and 16 is based on the input of two independent phases of two independent generators 2 and 6. It goes without saying that each of the conversion units 10, 12, 14 and 16 comprises an output 10x, 12x, 14x and 16x, which provide an output voltage with a predetermined (controlled) frequency and voltage level. FIG. 5 shows a switching circuit 30 coupled to the outputs 10x, and 12x and to an electrical power supply line 40, which extends to the electrical consumers (not shown). The switching circuit 30 is adapted for selectively connecting the outputs of the at least two electrical conversion units to the electrical power line.

As depicted in FIGS. 2a and 2b, a conversion unit 10 may comprise a rectification and conversion device 18 in the form of an active rectifier, which has actively controlled switching elements (FIG. 2a) or in a separated form with a rectifier 20 and a subsequent electrical conversion device 22, which is fed with a DC voltage from the rectifier 20 and provides a voltage with a predetermined frequency voltage level (see FIG. 2b).

FIG. 3 shows another example for a system 23 with the same arrangement of generators 2 and 6 mechanically coupled to the two engines 4 and 8, but with only a set of two conversion units 24 and 26, which each comprise four inputs 24a, 24b, 24c and 24d as well as 26a, 26b, 26c and 26d, respectively. Both conversion units 24 and 26 comprise a single output 24x and 26x, respectively and an exemplary input connection according to the following table.

TABLE 2

| Conversion unit | Input | Generator | Phase |
|---|---|---|---|
| 24 | 24a | 6 | 6a |
| 24 | 24b | 6 | 6b |
| 24 | 24c | 2 | 2a |
| 24 | 24d | 2 | 2b |
| 26 | 26a | 2 | 2c |
| 26 | 26b | 2 | 2d |
| 26 | 26c | 6 | 6c |
| 26 | 26d | 6 | 6d |

While the reliability is further improved, also a ripple effect of the DC voltage created in the conversion units 24 and 26 is reduced, since more phases are fed into the conversion units.

FIG. 4 further shows an aircraft 28 having two engines 4 and 8 as well as four electrical bus bars (not shown), which are separated into a left essential bus bar, a left non-essential bus bar, a right essential bus bar as well as a right non-essential bus bar. Exemplarily, the aircraft 28 may comprise the electrical power supply system 1 shown in FIG. 1, wherein each of the electrical conversion units 10, 12, 14 and 16 may be coupled with one of the bus bars.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An electrical power supply system for an aircraft, comprising:
   at least a first generator and a second generator, each being couplable to and rotatable by an aircraft engine, each of the at least first and second generators comprising at least four AC phases; and
   a first electrical conversion unit, a second electrical conversion unit, a third electrical conversion unit, and a fourth electrical conversion unit, each having at least a first input and a second input and at least one output,
   wherein the first and second inputs of the first electrical conversion unit are connected to the first phases of the at least first and second generators, respectively,
   wherein the first and second inputs of the second electrical conversion unit are connected to the second phases of the at least first and second generators, respectively,
   wherein the first and second inputs of the third electrical conversion unit are connected to the third phases of the at least first and second generators, respectively,
   wherein the first and second inputs of the fourth electrical conversion unit are connected to the fourth phases of the at least first and second generators, respectively,
   wherein the first and second electrical conversion units each comprise a rectification and conversion device for providing an output voltage having a predeterminable frequency and voltage level at the output.

2. The system of claim 1, wherein each electrical conversion unit comprises a number of inputs, which equals an integer multiple of the number of generators, wherein the inputs of each electrical conversion unit are coupled with a corresponding number of phases of each generator.

3. The system of claim 2, wherein the integer multiple is at least two.

4. The system of claim 1, wherein the number of electrical conversion units is equal to the number of AC phases per generator.

5. The system of claim 1, wherein the number of electrical conversion units is less than the number of AC phases per generator, wherein the inputs of each electrical conversion unit is coupled with a corresponding number of phases of a part of the generators.

6. The system of claim 1, wherein each of the AC phases of each of the generators is connected to a different electrical conversion unit.

7. The system of claim 1,
   wherein each of the electrical conversion units comprises a rectification device for each of its inputs, and
   wherein each rectification device is adapted for conducting a rectification of the voltage at the associated input prior to generating an output voltage.

8. The system of claim 1,
   wherein each of the electrical conversion units comprises a single output, and
   wherein each of the electrical conversion units is adapted for generating a single voltage at the output from rectified voltages of all inputs.

9. The system of claim 1,
   wherein the outputs of at least two electrical conversion units are connected to a switching circuit, which is connected to a single electrical power supply line, and wherein the switching circuit is adapted for selectively connecting the outputs of the at least two electrical conversion units to the electrical power line.

10. The system of claim 9, wherein the switching circuit is adapted for exclusively connecting only one of the outputs to the electrical power line at a time.

11. The system of claim 9,
wherein the switching circuit is adapted for connecting more than one of the outputs to the electrical power line at a time, and
wherein the associated electrical conversion units are adapted for providing synchronized frequencies of the voltages at the associated outputs.

12. The system of claim 1, wherein the generators are permanent magnet generators.

13. The system of claim 1, wherein at least one of the electrical conversion units is adapted for providing a DC current at the associated output.

14. An aircraft having at least two engines and at least one electrical power supply system, the system comprising:
at least first and second generators, each being couplable to and rotatable by an aircraft engine, each of the at least first and second generators comprising at least four AC phases; and
a first electrical conversion unit and a second electrical conversion units, each having a first input, a second input, a third input and a fourth input and at least one output,
wherein the first input of the first electrical conversion unit is connected to the first phase of the first electrical generator,
wherein the second input of the first electrical conversion unit is connected to the second phase of the first electrical generator,
wherein the third input of the first electrical conversion unit is connected to the first phase of the second electrical generator,
wherein the fourth input of the first electrical conversion unit is connected to the second phase of the second electrical generator,
wherein the first input of the second electrical conversion unit is connected to the third phase of the first electrical generator,
wherein the second input of the second electrical conversion unit is connected to the fourth phase of the first electrical generator,
wherein the third input of the second electrical conversion unit is connected to the third phase of the second electrical generator,
wherein the fourth input of the second electrical conversion unit is connected to the fourth phase of the second electrical generator, and
wherein the electrical conversion units each comprise a rectification and conversion device for providing an output voltage having a predeterminable frequency and voltage level at the output.

15. The aircraft of claim 14, wherein the aircraft comprises at least two electrical buses, each of the electrical buses being connected to the output of a different electrical conversion unit.

* * * * *